United States Patent [19]

Almer et al.

[11] 3,956,659
[45] May 11, 1976

[54] GAS-FILLED ELECTRIC INCANDESCENT LAMP HAVING A CYLINDRICAL ENVELOPE AND AN AXIALLY ARRANGED FILAMENT BODY

[75] Inventors: Friedrich Hermann Raymönd Almer; Jan de Ridder; Germain Remi T'Jampens, all of Eindhoven, Netherlands

[73] Assignee: U.S. Philips Corporation, New York, N.Y.

[22] Filed: Apr. 26, 1974

[21] Appl. No.: 464,631

[30] Foreign Application Priority Data
May 5, 1973  Netherlands .................... 7306307

[52] U.S. Cl. ............................... 313/222; 313/184
[51] Int. Cl.² ........................................ H01K 5/02
[58] Field of Search ........................... 313/222, 184

*Primary Examiner*—R. V. Rolinec
*Assistant Examiner*—Darwin R. Hostetter
*Attorney, Agent, or Firm*—Frank R. Trifari

[57] ABSTRACT

In a two-pinch halogen lamp having an axial filament and an envelope diameter of less than 3.5 mm the envelope diameter is chosen as a function of the envelope and filament temperature, the coil diameter and the filling pressure.

6 Claims, 1 Drawing Figure

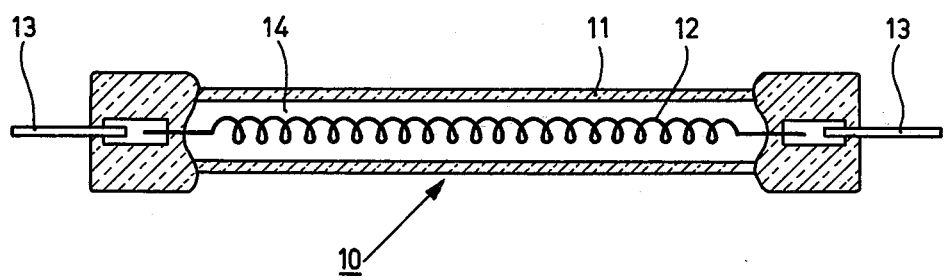

GAS-FILLED ELECTRIC INCANDESCENT LAMP HAVING A CYLINDRICAL ENVELOPE AND AN AXIALLY ARRANGED FILAMENT BODY

The invention relates to a gas-filled electric incandescent lamp having a cylindrical envelope and an axially arranged filament body of tungsten. The filament body may consist of a straight wire, a coiled wire or a coiled-coil wire, in which the coil may have a circular or rectangular cross-section. One of the rare gases known for this purpose such as argon, Krypton or xenon mixed or not mixed with nitrogen may be present as a filler gas in the lamp. The filler gas may comprise one or more halogens such as iodine, bromine, chlorine and/or fluorine and furthermore hydrogen to inhibit the reactivity of these halogens.

The lifetime of such a lamp is directly dependent on the quantity of tungsten evaporating from the filament body. It is known that the tungsten transport of the filament body to the wall of the envelope in an incandescent lamp is dependent on:

| | |
|---|---|
| temperature of the filament body (filament temperature) | $T_F$ (°K) |
| temperature of the wall of the envelope | $T_B$ (°K) |
| surface filament body | $O_F = a \pi l$ (sq.cm) |
| filling pressure | $P_o$ (atm.) |
| Type of gas (Ar, Kr, Xe possibly mixed with nitrogen). | |

The transport may be defined by the following formula $$j = D 2 \pi l \frac{C_w}{\ln \frac{b}{a}} \quad (1)$$

in which the symbols used have the following significance:

$J$ = mole tungsten per second
$C_w$ = concentration (mol. cm$^{-3}$) at T=$T_F$ (vapour pressure tungsten)
$l$ = length filament wire or coil (cm)
$a$ = diameter filament wire or coil (cm)
$b$ = diameter across which the tungsten transport can exclusively be described by diffusion (cm)
$D$ = diffusion constant (sq. cm/sec)
in which $$D = \frac{3 \sqrt{R}}{8 \sqrt{2\pi}} \cdot \frac{\sqrt{T}}{n_1 \delta^2{}_{1,2}} \sqrt{\frac{M_1 + M_2}{M_1 \cdot M_2}} \quad (2)$$

in which
$R$ = gas constant ($8.314 \cdot 10^7$ erg mol$^{-1}$ °K$^{-1}$)
$T$ = temperature (°K)
$n_1$ = number of atoms or molecules per cubic cm of the filler gas (cm$^{-3}$)

$$\delta_{1,2} = \frac{\delta_1 + \delta_2}{2}$$

in which $\delta_1$ and $\delta_2$ are atom and molecule diameters (cm), respectively
$M_1$ = atomic or molecular weight of the filler gas
$M_2$ = atomic weight of tungsten.

The magnitude $b$ in the transport formula (1) may be found as follows:

$$b \ln b/a = 2B \quad (3)$$

in which $$B = 7.2 \left(\frac{\mu}{\rho}\right)^{2/3} (g \cdot \beta \cdot \Theta \cdot Pr)^{1/3} \quad (4)$$

in formula (4)
$\mu$ = viscosity of the filler gas (g/cm sec)
$\rho$ = density of the filler gas (g/cubic cm)
$g$ = acceleration of gravitation (cm/sq. sec)
$\beta$ = $1/T_B$ reciprocal temperature of the wall envelope (1/°K)
$\Theta = T_F - T_B$, $T_F$, $T_B$ temperature of filament body and envelope wall respectively.
Pr = Prandtl number (⅔ for uniatomic gases; 0.735 for biatomic gases).

It is obvious that the aim is to render the tungsten transport at a given temperature of the filament body as little as possible. Known means for this purpose which have already been used are the use of
  (a) a gas having the highest possible atomic weight
  (b) maximum filling pressure (which is limited upwards by the strength of the envelope).

The foregoing not only applies to lamps filled exclusively with rare gas or mixtures thereof with nitrogen but also for so-called cycle lamps in which the tungsten evaporated from the filament body is transported back to the filament body through a gaseous tungsten compound WX formed in the lamp with an element X where it decomposes again in W and X. X may be for example iodine, bromine, chlorine, fluorine or mixtures thereof. The condition for working with such a cycle is that the tungsten transport $J_W$ to the wall of the envelope is not larger than the transport $J_{WX}$ from the wall of the envelope to the filament body. Generally the condition $J_W = J_{WX}$ will be satisfied when the pressure of the compound WX at the envelope wall temperature $T_B$ is higher than the pressure of W at the filament body temperature $T_F$, that is to say $$P_{wx} \Big|_{T=T_B} > P_w \Big|_{T=T_F} \quad (5)$$

The pressure must be larger and must not be equal because the larger and heavier WX-molecule diffuses at a slower rate than the lighter W-atom. In an ideal filament body such a lamp would have an unlimited lifetime as long as the temperature of the filament body does not reach the melting point of tungsten. The fact that in practice a minimum primary tungsten transport, that is to say, transport from the filament body to the wall of the envelope must be aimed at resides in imperfections of filament and coil which are substantially inevitable. A filament substantially always has at least in one place a deviating diameter or a diviating radiation capacity. The temperature of such a place will be higher than that of the rest of the filament body when, for example, the diameter or the conductivity at that area is smaller or when the radiation capacity is smaller than that of the rest of the filament. A relatively larger quantity of tungsten will evaporate on such a place having a higher temperature than from the rest of the filament. The extent of re-transport in the conventional halogens iodine, bromine, chlorine is, however, not influenced or hardly influenced by local temperature differences. This results in more tungsten being evaporated from these places having a higher temperature rather than a re-transport so that the temperature at that area will increase all the time. This continues until the melting point of tungsten is reached and with that the end of the lifetime of the filament body. When using fluorine it is true that evaporated tungsten is transported back to the hottest places. Fluorine, however, attacks especially the relatively cold metal parts of the lamp so that it is important to maintain the cycle with a minimum quantity of fluorine. Thus it is advantageous to suppress the evaporation of tungsten and hence the tungsten transport as much as possible in so-called cycle lamps. In modern cycle lamps the filling pressure is therefore chosen to be as high as possible as is admissible in connection with the strength of the wall of the envelope at the desired operating temperature and the obtained operating pressure in the lamp.

The diameter of the envelope is in practice generally chosen to be such that at the temperature of the wall of the envelope during operation ($T_B$) the partial pressure of the WX compound ($P_{WX}$) is larger than the partial pressure of tungsten ($P_W$) at the temperature of the filament body ($T_F$).

$$P_{wx}\Big|_{T=T_B} > P_w\Big|_{T=T_F} \quad (5)$$

Based on the formula for tungsten transport (1) an increase of the tungsten transport may be expected when the diameter of the envelope decreases. In practice the diameter of the envelope is therefore chosen to be such that the temperature of the wall of the envelope during operation is still just sufficiently high to satisfy condition (5).

It is an object of the invention to improve the properties of gas-filled electric incandescent lamps having a cylindrical envelope and an axially arranged filament body of tungsten. It was surprisingly found that this can be achieved with a lamp whose filling pressure $P_o$ is larger than 1 atmosphere and the internal diameter is smaller than 3.5 mm, satisfying the following condition: $d_{int} = A \cdot T_F{}^\alpha \cdot T_B{}^\beta \cdot a^\gamma \cdot P_o^\delta$, in which $A, \alpha, \beta, \gamma$ and $\delta$ are constants which are dependent on the nature of the filler gas and the filling pressure, $T_F$ = the temperature of the filament body
$T_B$ = the temperature of the wall of the envelope
$a$ = the filament wire or coil diameter and
$P_o$ = the filling pressure.

The invention is based on the surprising aspect that the tungsten transport in a gas-filled electric incandescent lamp is not a monotonously decreasing function of the envelope diameter as might be expected on the ground of the formula (1) for tungsten transport if the filling pressure is 1 atmosphere or more and the diameter of the envelope is less than 3.5 mm. It was found that the tungsten transport under these circumstances for a given diameter has a minimum.

For argon the constants according to the invention were found to have the values stated in table I below.

Table I

|   | 1 atm < $P_o$ < 4 atm | $P_o$ > 4 atm |
|---|---|---|
| A | 0.764 | 0.691 |
| α | 0.096 | 0.096 |
| β | 0.183 | 0.183 |
| γ | 0.448 | 0.448 |

Table I-continued

|   |   |   |
|---|---|---|
| δ | −0.421 | −0.321 | for $T_F = 3100°K$, $T_B = 750°K$, $a = 1.1$ mm and $p = 4$ atm., $d_{int}$ will become 3.2 mm.
for $T_F = 3100°K$, $T_B = 750°K$, $a = 1.1$ mm, $p = 15$ atm., $d_{int}$ will become 2.1 mm.

For Krypton the constants according to the invention were found to have the values of table II.

Table II

|   | 1 atm < $P_o$ < 4 atm | $P_o$ > 4 atm |
|---|---|---|
| A | 0.8495 | 0.7478 |
| α | 0.058 | 0.058 |
| β | 0.177 | 0.177 |
| γ | 0.495 | 0.495 |
| δ | −0.395 | −0.303 | for $T_F = 3100°K$, $T_W = 450°K$, $a = 1.1$ mm and $P_o = 4$ atm, $d_{int}$ will become 2.65 mm.
for $P_o = 16$ atm $d_{int}$ will become 1.74 mm.

For xenon the constants according invention the invention were found to have the values of table III.

Table III

|   | 1 atm < $P_o$ < 4 atm | $P_o$ > 4 atm |
|---|---|---|
| A | 1.107 | 0.960 |
| α | 0 | 0 |
| β | 0.176 | 0.176 |
| γ | 0.555 | 0.555 |
| δ | −0.367 | −0.264 | for $T_F = 3100°K$, $T_B = 750°K$, $a = 1.1$ mm and $P_o = 4$ atm, $d_{int}$ will become 2.25 mm
for $T_F = 3100°K$, $T_B = 750°K$, $a = 1.1$ mm and $P_o = 16$ atm, $d_{int}$ will become 1.56 mm.

The values for the constants given in Tables 1, 2 and 3 remain the same when the rare gas comprises up to 10% by volume of nitrogen and/or the conventional quantities of a transport gas.

When using the invention the tungsten transport is found to have been reduced by 30 to 40 % as compared with lamps proportioned in the conventional manner. This reduction in tungsten transport becomes directly manifest in an extension of the lifetime as is apparent from the examples below.

EXAMPLE I.

A 14 Volt, 70 Watt lamp was manufactured with a cylindrical envelope of quartz and a filament coil of tungsten located on the axis of the cylinder. The temperature of the filament coil was 3500°K, the temperature of the wall of the envelope was 1000°K. The diameter of the filament coil was 1.1 mm. The pressure of the filler gas was 15 atm. The filler gas consisted of hydrogen bromide having a partial pressure of 100 Torr, remainder Krypton.

It was calculated that it was necessary for a minimum tungsten transport to use an internal envelope diameter of 2.1 mm. The lifetime of the lamp was approximately 100 hours. It was found that such a lamp has a lifetime which is clearly longer than that of a lamp whose internal diameter of the envelope is more than 2.3 mm or less than 2 mm.

EXAMPLE II

A 24 Volt, 135 Watt lamp was manufactured with a cylindrical envelope of quartz and a filament coil of tungsten located on the axis of the cylinder.

The temperature of the filament coil was 3200°K, the temperature of the wall of the envelope was 900°K. The diameter of the filament coil was 1.3 mm. The pressure of the filler gas was 10 atm. and consisted of borontribromide with a partial pressure of 8 Torr, remainder krypton.

It was calculated that for a minimum tungsten transport it was necessary to use an internal envelope diameter of 2.5 mm.

It was found that such a lamp has a lifetime which is at least 1000 hours.

For an internal envelope diameter 0.183 less than 2.3 mm or more than 2.6 mm the lifetime becomes clearly shorter.

What is claimed is:

1. A gas filled electric incandescent lamp having a cylindrical envelope and an axially arranged filament body of tungsten, characterized in that the filling pressure is more than 1 at. and the internal diameter of the envelope is less then 3.5 mm, satisfying the condition $d_{int} = A \cdot T_F^\alpha \cdot T_B^\beta \cdot a^\gamma \cdot P_o^\delta$ in which A, $\alpha$, $\beta$, $\gamma$ and $\delta$ are constants which are dependent on the nature of the filler gas and the filling pressure, and $T_F$ = the temperature of the filament body (in °k)
$T_B$ = the temperature of the wall of the envelope (in °k)
$a$ = the filament diameter (in mm) and
$P_o$ = the filling pressure (in atm.) and $d_{int}$ is expressed in mm.

said lamp having an argon filling wherein $P_o$ is greater than 1 atmosphere and less than 4 atmospheres and the constants have the following values:

A = 0.764
$\alpha$ = 0.096
$\beta$ = 0.183
$\gamma$ = 0.448
$\delta$ = −0.421

2. A gas filled electric incandescent lamp having a cylindrical envelope and an axially arranged filament body of tungsten, characterized in that the filling pressure is more than 1 at. and the internal diameter of the envelope is less than 3.5 mm. satisfying the condition $d_{int} = A \cdot T_F^\alpha \cdot T_B^\beta \cdot a^\gamma \cdot P_o^\delta$ in which A, $\alpha$, $\beta$, $\gamma$ and $\delta$ are constants which are dependent on the nature of the filler gas and the filling pressure, and $T_F$ = the temperature of the filament body (in °k)
$T_B$ = the temperature of the wall of the envelope (in °k)
$a$ = the filament diameter (in mm) and
$P_o$ = the filling pressure (in atm.) and $d_{int}$ is expressed in mm.

said lamp having an argon filling wherein $P_o$ is greater than 4 atmospheres and the constants have the following values:

A = 0.691
$\alpha$ = 0.096
$\beta$ = 0.183
$\gamma$ = 0.448
$\delta$ = −0.321

3. A gas filled electric indandescent lamp having a cylindrical envelope and an axially arranged filament body of tungsten, characterized in that the filling pressure is more than 1 at. and the internal diameter of the envelope is less than 3.5 mm. satisfying the condition $d_{int} = A \cdot T_F^\alpha \cdot T_B^\beta \cdot a^\gamma \cdot P_o^\delta$ in which A, $\alpha$, $\beta$, $\gamma$ and $\delta$ are constants which are dependent on the nature of the filler gas and the filling pressure, and $T_F$ = the temperature of the filament body (in °k)
$T_B$ = the temperature of the wall of the envelope (in °k)
$a$ = the filament diameter (in mm) and
$P_o$ = the filling pressure (in atm.) and $d_{int}$ is expressed in mm.

said lamp having a krypton filling wherein $P_o$ is greater than 1 atmosphere and less than 4 atmospheres and the constants have the following values:

A = 0.8495
$\alpha$ = 0.058
$\beta$ = 0.177
$\gamma$ = 0.495
$\delta$ = −0.395

4. A gas filled electric incandescent lamp having a cylindrical envelope and an axially arranged filament body of tungsten, characterized in that the filling pressure is more than 1 at. and the internal diameter of the envelope is less than 3.5 mm. satisfying the condition $d_{int} = A \cdot T_F^\alpha \cdot T_B^\beta \cdot a^\gamma \cdot P_o^\delta$ in which A, $\alpha$, $\beta$, $\gamma$ and $\delta$ are constants which are dependent on the nature of the filler gas and the filling pressure, and $T_F$ = the temperature of the filament body (in °k)
$T_B$ = the temperature of the wall of the envelope (in °k)
$a$ = the filament diameter (in mm) and
$P_o$ = the filling pressure (in atm.) and $d_{int}$ is expressed in mm., said lamp having a krypton filling and where $P_o$ is greater than four atmospheres and the constants have the following values:

A = 0.7478
$\alpha$ = 0.058
$\beta$ = 0.177
$\gamma$ = 0.495
$\delta$ = −0.303

5. A gas filled electric incandescent lamp having a cylindrical envelope and an axially arranged filament body of tungsten, characterized in that the filling pressure is more than 1 at. and the internal diameter of the envelope is less than 3.5 mm. satisfying the condition $d_{int} = A \cdot T_F^\alpha \cdot T_B^\beta \cdot a^\gamma \cdot P_o^\delta$ in which A, $\alpha$, $\beta$, $\gamma$ and $\delta$ are constants which are dependent on the nature of the filler gas and the filling pressure, and $T_F$ = the temperature of the filament body (in °k)
$T_B$ = the temperature of the wall of the envelope (in °k)
$a$ = the filament diameter (in mm) and
$P_o$ = the filling pressure (in atm.) and $d_{int}$ is expressed in mm., said lamp having a xenon filling wherein $P_o$ is greater than one atmosphere and less than four atmospheres and the constants have the following values:

A = 1.107
$\alpha$ = 0
$\beta$ = 0.176
$\gamma$ = 0.555
$\delta$ = 0.367

6. A gas filled electric incandescent lamp having a cylindrical envelope and an axially arranged filament body of tungsten, characterized in that the filling pressure is more than 1 at. and the internal diameter of the envelope is less than 3.5 mm. satisfying the condition $d_{int} = A \cdot T_F^\alpha \cdot T_B^\beta \cdot a^\gamma \cdot P_o^\delta$ in which A, $\alpha$, $\beta$, $\gamma$ and δ are constants which are dependent on the nature of the filler gas and the filling pressure, and $T_F$ = the temperature of the filament body (in °k)
$T_B$ = the temperature of the wall of the envelope (in °k)
$a$ = the filament diameter (in mm) and
$P_o$ = the filling pressure (in atm.) and $d_{int}$ is expressed in mml, said lamp having a xenon filling and $P_o$ is greater than 4 atmospheres wherein the constants have the following values:
A = 0.960
α = 0
β = 0.176
γ = 0.555
δ = −0.264

* * * * *

UNITED STATES PATENT AND TRADEMARK OFFICE
CERTIFICATE OF CORRECTION

PATENT NO. : 3,956,659
DATED : May 11, 1976
INVENTOR(S) : Friedrich Hermann Raymund Almer et al It is certified that error appears in the above-identified patent and that said Letters Patent are hereby corrected as shown below:

[75] Inventors name "Raymond" should be --Raymund--.

Column 2, equation 4, "$(g.B.O. Pr)^{1/3}$" should be --$(g.B.\theta. Pr)^{-1/3}$--

Column 4, line 24, "invention" should read -- to --.

Column 5, line 17, "0.183" should be --of--.

Signed and Sealed this

First Day of February 1977

[SEAL]

Attest:

RUTH C. MASON
Attesting Officer

C. MARSHALL DANN
Commissioner of Patents and Trademarks